US012128709B2

(12) United States Patent
Comstock (10) Patent No.: US 12,128,709 B2
(45) Date of Patent: Oct. 29, 2024

(54) HUBCAP REMOVAL DEVICE AND METHOD OF USE

(71) Applicant: The Reinalt-Thomas Corporation, Scottsdale, AZ (US)

(72) Inventor: Shannon Comstock, Flagstaff, AZ (US)

(73) Assignee: THE REINALT-THOMAS CORPORATION, Scottsdale, AZ (US)

( * ) Notice: Subject to any disclaimer, the term of this patent is extended or adjusted under 35 U.S.C. 154(b) by 0 days.

(21) Appl. No.: 17/990,400

(22) Filed: Nov. 18, 2022

(65) Prior Publication Data

US 2024/0165993 A1 May 23, 2024

(51) Int. Cl.
*B60B 31/06* (2006.01)

(52) U.S. Cl.
CPC .......... *B60B 31/06* (2013.01); *B60B 2320/16* (2013.01)

(58) Field of Classification Search
CPC ............... B60B 31/06; B60B 2320/16; B60B 2900/113; B25B 27/0035; B66F 15/00; B25D 1/16
See application file for complete search history.

(56) References Cited

U.S. PATENT DOCUMENTS

| | | | |
|---|---|---|---|
| 1,724,435 A * | 8/1929 | Studwell | B25B 9/04 294/174 |
| 2,108,197 A | 2/1938 | Du | |
| 2,755,539 A | 7/1956 | Weynand | |
| 4,202,088 A * | 5/1980 | Hansen | B25B 27/0035 29/280 |
| 4,458,415 A * | 7/1984 | Maher | B28D 1/26 81/463 |
| 5,109,739 A * | 5/1992 | Hull | B60B 29/003 81/463 |
| 5,876,080 A | 3/1999 | Grippo | |
| 6,994,322 B1 * | 2/2006 | Wittman | A44B 15/005 254/131 |
| 8,122,793 B2 * | 2/2012 | Campbell, Jr. | B25D 1/16 81/463 |
| 2003/0029278 A1 * | 2/2003 | Macioce | B25G 1/01 81/22 |

(Continued)

FOREIGN PATENT DOCUMENTS

| | | |
|---|---|---|
| DE | 1036673 B | 8/1958 |
| DE | 29517804 U1 | 4/1996 |
| KR | 100182912 B1 | 5/1999 |

*Primary Examiner* — Seahee Hong
(74) *Attorney, Agent, or Firm* — Ballard Spahr LLP (57) ABSTRACT

A device configured to remove a hubcap from a wheel of a vehicle without using torque or leverage applied against a component that is not the hubcap is disclosed. The device is configured to remove the hubcap by applying a force to the hubcap along a first axis that is perpendicular to the hubcap. The device comprises a shaft and a slide hammer. The shaft includes a first end and a second end. The first end includes a hook having a degree of bend greater than 90 degrees. The slide hammer is coupled to the shaft between the first end and the second end. A first force acting on the slide hammer along a first axis perpendicular to the hubcap in a first direction away from the wheel causes the hook to apply a second force to the hubcap along the first axis in the first direction.

12 Claims, 10 Drawing Sheets

(56) References Cited

U.S. PATENT DOCUMENTS

| | | | |
|---|---|---|---|
| 2011/0309646 A1* | 12/2011 | Wells | B25G 1/04 |
| | | | 294/175 |
| 2015/0015012 A1* | 1/2015 | Coleman | B66F 19/00 |
| | | | 294/175 |
| 2017/0043468 A1* | 2/2017 | Wade | B25F 1/006 |
| 2021/0114409 A1 | 4/2021 | Dickherber | |

* cited by examiner

HUBCAP REMOVAL DEVICE AND METHOD OF USE

FIELD

This disclosure relates to a device and method for removing a hubcap, and in some exemplary aspects, to a device and method for removing hubcaps of dual rear-wheel vehicles.

BACKGROUND

Current devices and methods for removing hubcaps, particularly, hubcaps of dually trucks, generally utilize torque or leverage applied to the inside or other part of the wheel to remove the hubcap. This torque or leveraging force may damage the wheel and/or hubcap. For example, a device that requires the user to pry the hubcap from the wheel by angling the tool to use the wheel as leverage may scratch and/or crack the wheel and/or hubcap. Further, these devices and methods, which require torque or leverage, may result in injury to the user when the force applied suddenly becomes great enough to release the hubcap from the lug nuts of the wheel. Another issue with many designs of current devices is that the tool does not have efficient dimensions to reach the hubcap slots which are typically located where the hubcap meets the deepest part of the wheel well. These devices, which are often too short and/or too wide may cause scratching when the user attempts to insert the tool in the hubcap slot. Accordingly, a device which reduces or eliminates damage to the hubcap and/or wheel and injury to the user is desirable.

SUMMARY

Described herein, in various aspects, is a device that may be configured to remove a hubcap from a wheel of a vehicle without using torque or leverage applied against a component that is not the hubcap.

In a further aspect, the device may be further configured to remove the hubcap by applying a force to the hubcap along a first axis that is perpendicular to the hubcap.

In one aspect, the device may comprise a shaft and a slide hammer. The shaft may include a first end and a second end. The first end may include a hook having a degree of bend greater than 90 degrees. The slide hammer may be coupled to the shaft between the first end and the second end. A first force acting on the slide hammer along a first axis perpendicular to the hubcap in a first direction away from the wheel may cause the hook to apply a second force to the hubcap along the first axis in the first direction.

In one aspect, the shaft may have a length ranging from 11.5 to 13.5 inches.

In one aspect, the degree of bend of the hook may range from 130 to 200 degrees.

In one aspect, the slide hammer may be spring loaded.

In one aspect, the hook may include a rubber coating.

In one aspect, the hook may have a width ranging from 0.4 to 0.6 inches.

In one aspect, the hook may have an inner radius ranging from 0.1 to 0.3 inches.

In one aspect, the device may further comprise a grip coupled to the second end of the shaft.

In a further aspect, the grip may include a receiving portion configured to receive the second end of the shaft and an elastomeric base having a diameter greater than a diameter of the receiving portion of the grip.

Described herein, in various aspects, is a method of removing a hubcap from a wheel of a vehicle using a device configured to remove the hubcap without using torque or leverage applied against a component that is not the hubcap.

In a further aspect, the hubcap may be removed by using the device to apply a force to the hubcap along a first axis that is perpendicular to the hubcap.

In one aspect, the device may comprise the details and embodiments previously described.

In one aspect, the method may comprise inserting the hook into a slot in the hubcap, and applying the first force to the slide hammer by pulling on the slide hammer to cause the second force on the hubcap.

In a further aspect, a user of the device may provide pressure to the hubcap with a first hand and pull the slide hammer with a second hand.

In one aspect, the method may further comprise inserting the hook into a second slot in the hubcap, and applying the first force to the slide hammer by pulling on the slide hammer to cause the second force on the hubcap.

Described herein, in various aspects, is a method of attaching a hubcap to a wheel of a vehicle using a device. The device may comprise a shaft, a slide hammer, and a grip. The shaft may include a first end and a second end. The first end may include a hook having a degree of bend greater than 90 degrees. The slide hammer may be coupled to the shaft between the first end and the second end. The grip may include a receiving portion coupled to the second end of the shaft and an elastomeric base having a diameter greater than a diameter of the receiving portion of the grip.

In one aspect, the method may comprise using the elastomeric base to apply a force to the hubcap to attach the hubcap to the wheel.

In one aspect, a user of the device may provide pressure to the hubcap with a first hand and hold the device with a second hand.

DESCRIPTION OF THE DRAWINGS

FIGS. 8-10 are photographs of a method of removing a hubcap from a wheel with an example device.

FIG. 11 is a photograph of a method of installing a hubcap to a wheel.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" include plural referents unless the context clearly dictates otherwise. For example, use of the term "a force" can refer to one or more of such forces.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values are approximated by use of the antecedent "about," it is contemplated that values within up to 15%, up to 10%, up to 5%, or up to 1% (above or below) of the particularly stated value can be included within the scope of those aspects. Similarly, in some optional aspects, when values are approximated by use of the terms "approximately," "substantially," or "generally," it is contemplated that values within up to 15%, up to 10%, up to 5%, or up to 1% (above or below) of the particular value can be included within the scope of those aspects. When used with respect to an identified property or circumstance, "substantially" or "generally" can refer to a degree of deviation that is sufficiently small so as to not measurably detract from the identified property or circumstance, and the exact degree of deviation allowable may in some cases depend on the specific context.

As used herein, the terms "optional" or "optionally" mean that the subsequently described event or circumstance may or may not occur, and that the description includes instances where said event or circumstance occurs and instances where it does not.

The word "or" as used herein means any one member of a particular list and, except where the context indicates otherwise, in alternative aspects, can also include any combination of members of that list.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

Figure 1:
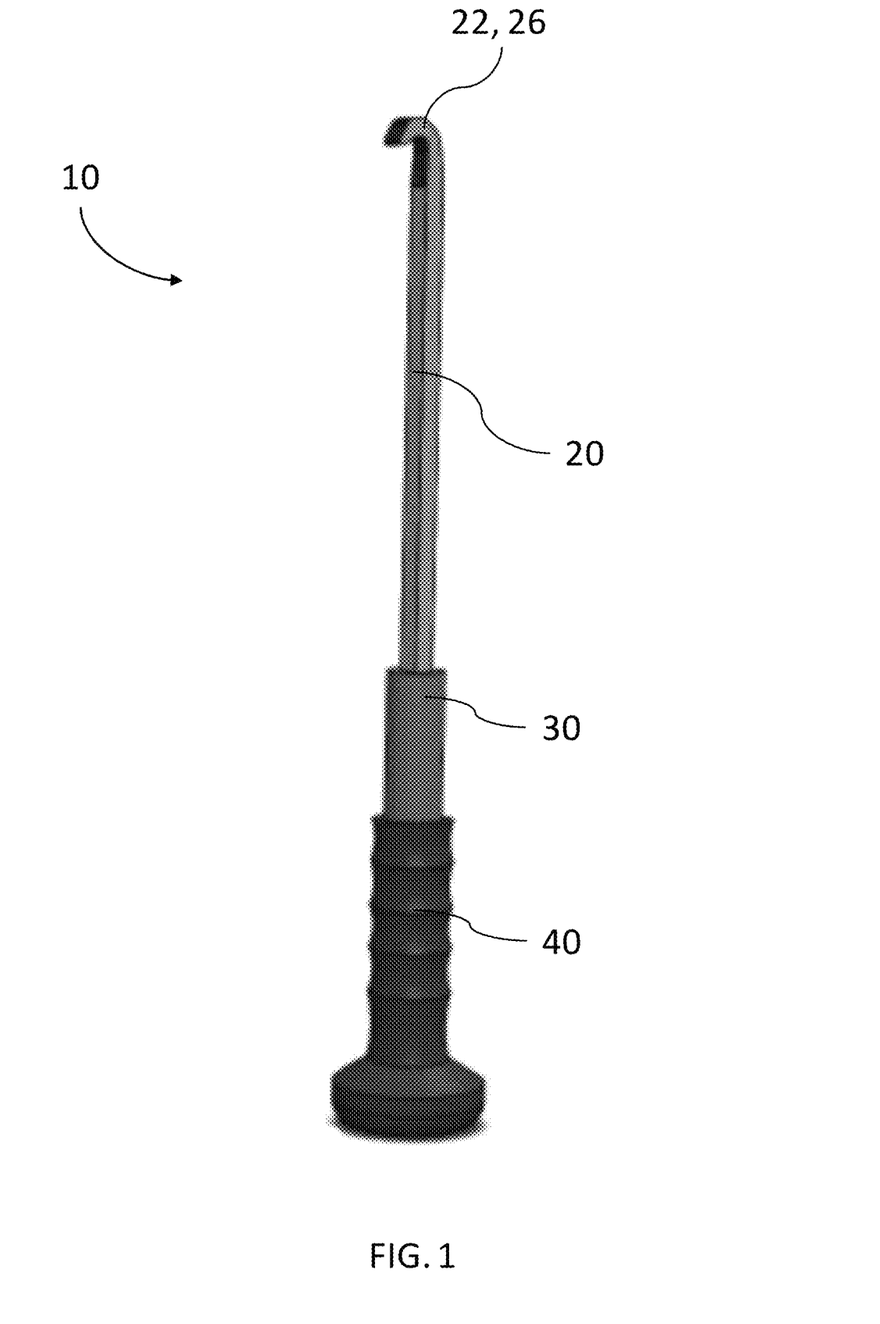
FIG. 1 is a perspective view of an example device for removing a hubcap as disclosed herein.
Figure 2:
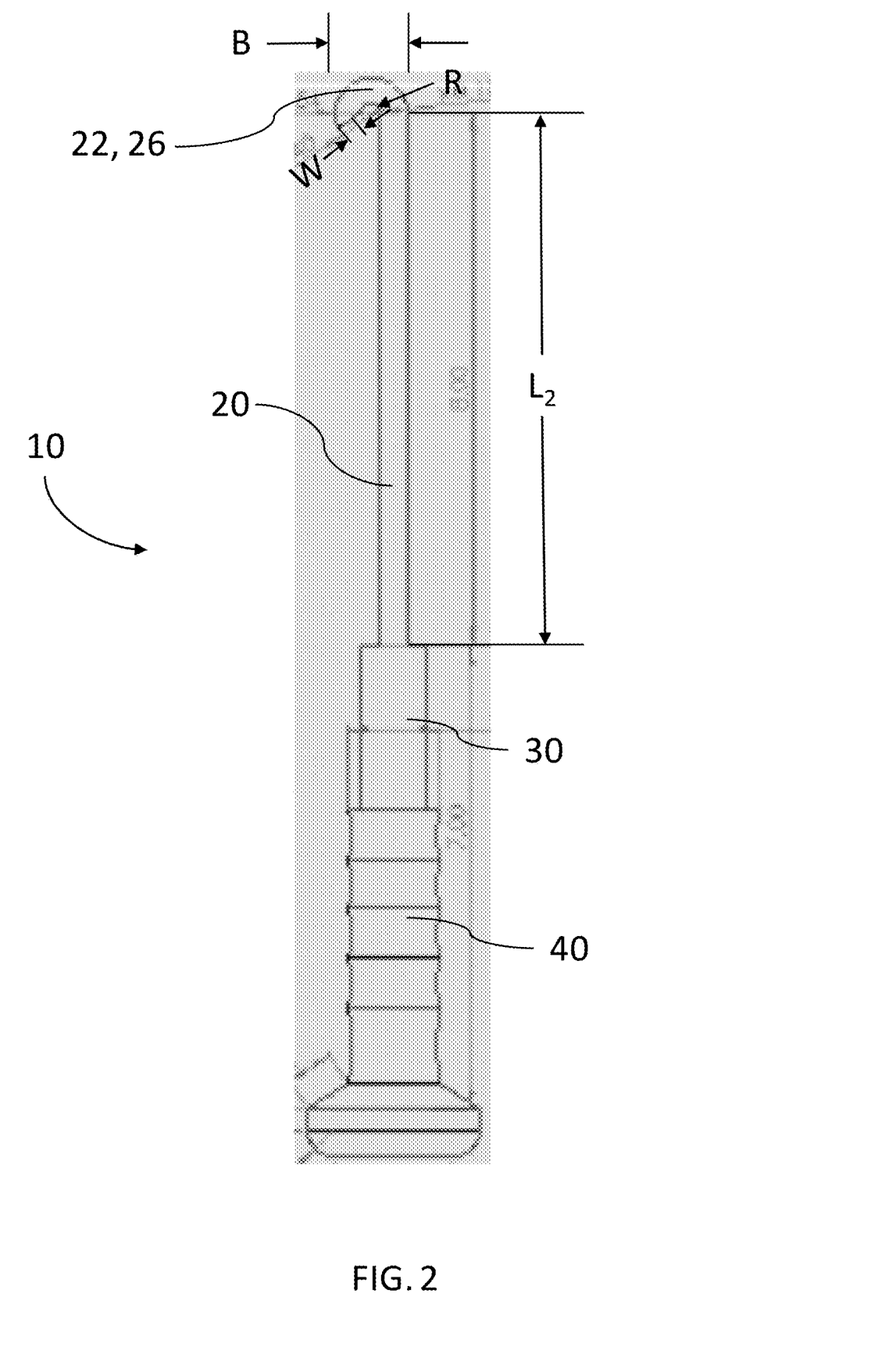
FIG. 2 is a drawing of a front view of the device of FIG. 1.

Disclosed herein, and with reference to FIG. 1 and FIG. 2, is a device 10 for removing a hubcap of a wheel of a vehicle. In one example, the device 10 may be for removing a hubcap of a wheel of a dually truck. The device 10 may be configured to remove a hubcap from a wheel of a vehicle without using torque or leverage applied against a component that is not the hubcap. For example, the device 10 may be configured to remove a hubcap without using torque or leverage applied against the inner wheel well or the tire. Further, the device 10 may be configured to remove the hubcap by applying a force to the hubcap along a first axis that is perpendicular to the hubcap. By applying force to only the hubcap and no other wheel components, the device 10 may eliminate or minimize damages, such as scratching or cracks, to other components of the wheel.

As shown in FIG. 1 and FIG. 2, the device 10 may include a shaft 20. The shaft 20 may include a first end 22 and a second end 24 (shown in FIGS. 4 and 5). The shaft 20 may have a first length $L_1$ between the first end 22 and the second end 24 (shown in FIG. 4). The shaft 20 may have a second length $L_2$ between the first end 22 and a slide hammer 30 (shown in FIG. 2). The first and second lengths $L_1$, $L_2$ may be configured to allow a user of the device 10 to insert the first end 22 into a wheel well to access a hubcap slot. The lengths $L_1$, $L_2$ may be configured to allow for using the device 10 in a deep wheel well, for example the wheel well of a dually truck. In one example, the first length $L_1$ may be about 11.5 to 13 inches. In one example, the second length $L_2$ may be about 7.5 to 9.5 inches when the slide hammer 30 is in the rested position.

Figure 4:
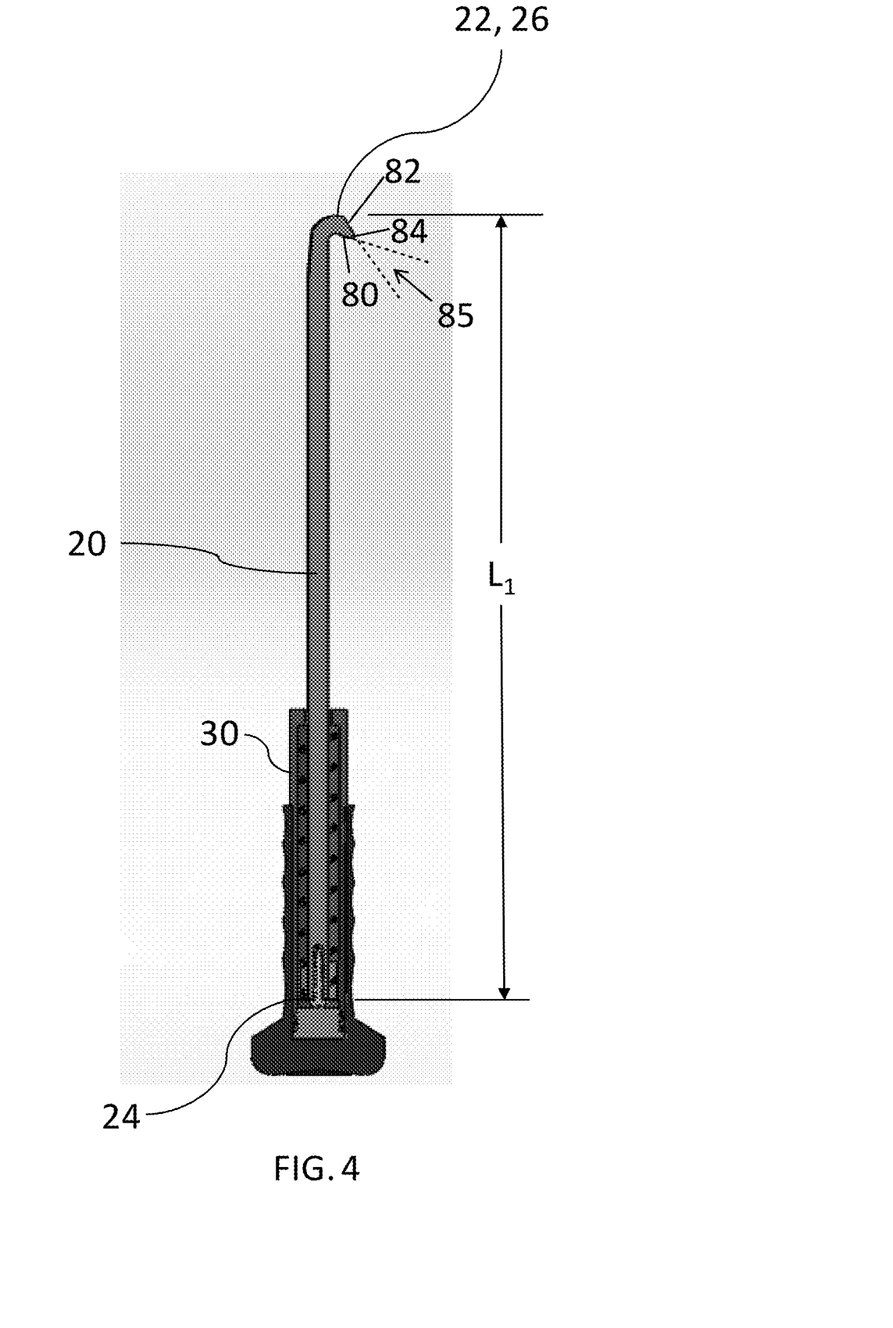
FIG. 4 is a section view of the example device of FIG. 1.

The first end 22 of the shaft 20 may include a hook 26. The hook 26 may have a degree of bend B greater than 90 degrees. In one aspect, the degree of bend B may range from 130 to 200 degrees. In one example, the hook 26 may have a degree of bend B of 180 degrees or about 180 degrees (for example, within 5, 10, or 15 degrees of 180 degrees). The hook 26 may be configured to engage a hubcap of a wheel of a vehicle via a slot in the hubcap. The hook 26 may have a width that is small enough to ensure ease of inserting the hook 26 into the slot. In one example, the width W may range from about 0.4 to 0.6 inches. In another example, the width W may be less than or equal to 0.5 inches or less than or equal to 0.4 inches. The hook 26 may also have an inner radius R configured latch onto the inner and outer wall of the hubcap to avoid slipping. In one example, the inner radius R may range from about 0.1 to 0.3 inches. In another example, the inner radius R may be less than or equal to 0.2 inches or less than or equal to 0.15 inches. In some exemplary aspects, as shown in FIG. 4, the hook 26 may have an inner surface 80 and an outer surface 82 that are angled (toward the second end 24 of the shaft 20) to meet at a tip 84. Optionally, in these aspects, the inner surface 80 and the outer surface 82 can include planar or substantially planar portions that intersect at the tip 29. Optionally, an angle 85 formed between the converging inner and outer surfaces 80, 82 may range from about 15 degrees to about 75 degrees or from about 25 degrees to about 60 degrees. It is contemplated that this tapered tip structure of the hook 26 can provide improved and/or easier access to the hubcap slot 52 (FIG. 8) as further disclosed herein.

Figure 3:
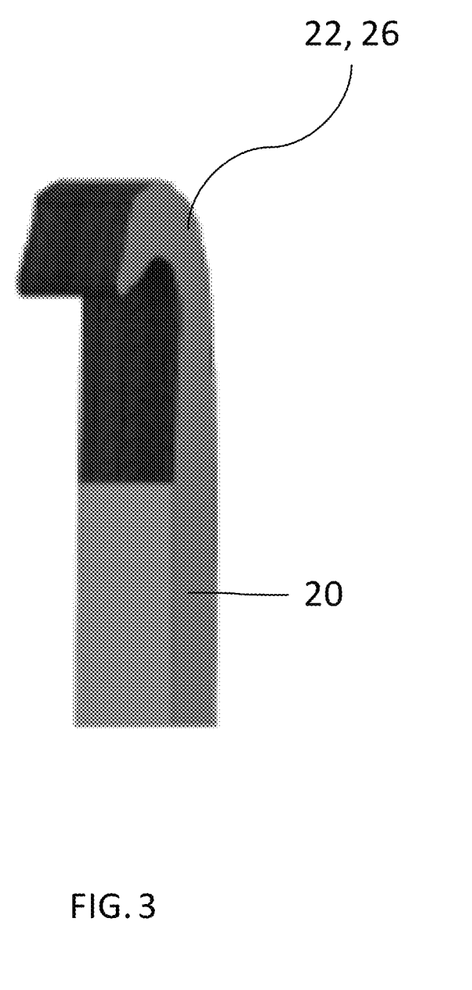
FIG. 3 is a perspective view of an example hook of the device of FIG. 1.

In exemplary aspects, the shaft 20 and slide hammer 30 may comprise steel or steel alloy materials. With reference to FIG. 3, the hook 26 may be coated to prevent scratching and to increase grip. In one example, the hook 26 may be rubber coated. Optionally, the hook can comprise steel or steel alloy that is coated with rubber or other suitable material.

Figure 5:
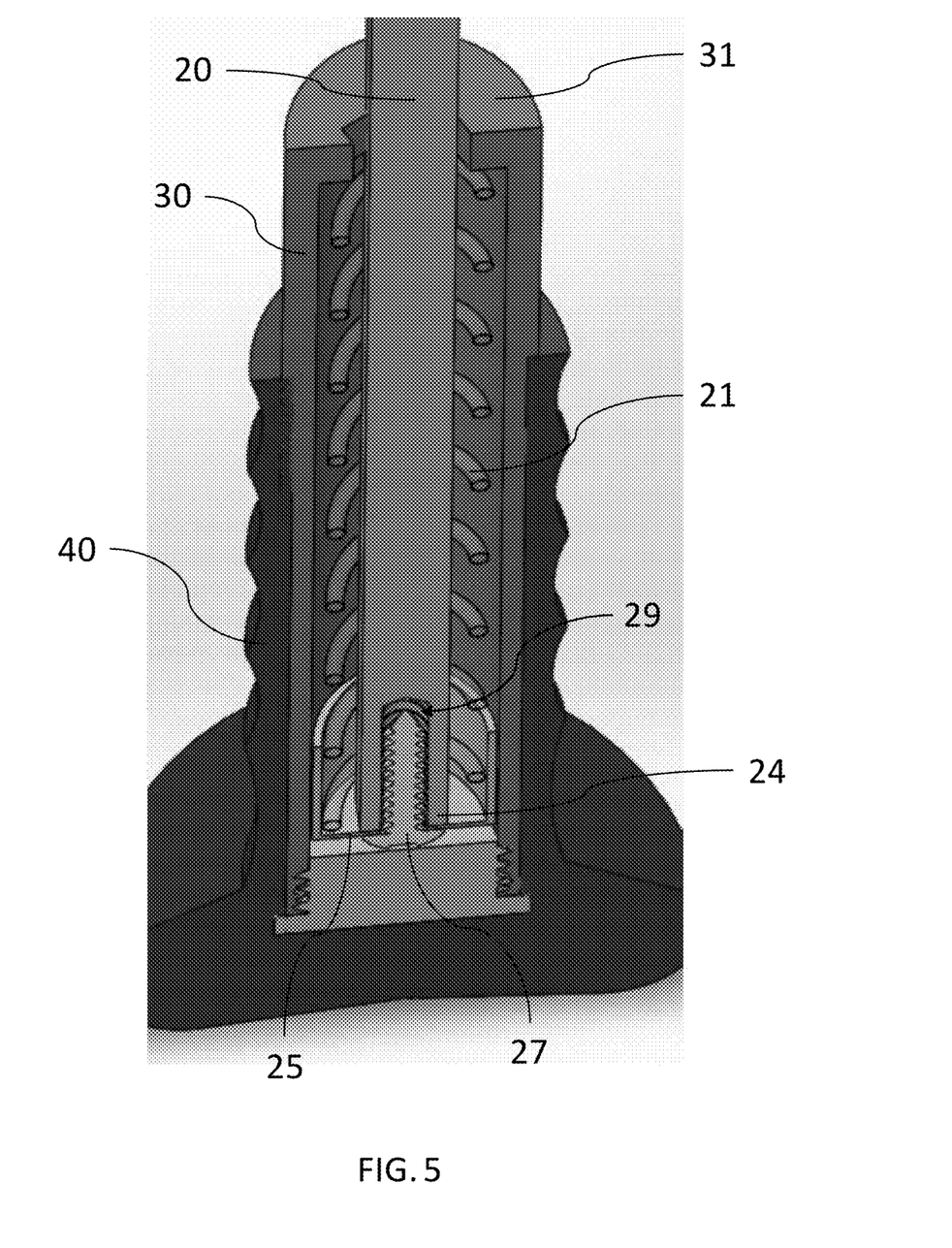
FIG. 5 is a section view of an example slide hammer of the device of FIG. 1.

As shown in FIG. 1 and FIG. 2, the slide hammer 30 may be coupled to the shaft 20 between the first end 22 and the second end 24. A first force acting on the slide hammer 30 along a first axis perpendicular to a hubcap in a first direction away from the wheel may cause the hook 26 to apply a second force to the hubcap along the first axis in the first direction. The slide hammer 30 may slide along the shaft 20. A force may pull the slide hammer 30 along the shaft 20 to impact a stop proximate to the second end of the shaft 20. For example, a user may use a hand to pull the slide hammer 30 along the shaft 20 until the slide hammer 30 impacts the stop. The inertia of the weight of the slide hammer 30 impacting the stop may be transferred to the shaft 20, pulling the hook 26 engaged with a hubcap in a direction perpendicular or substantially perpendicular to the hubcap to detach the hubcap from a wheel. Alternatively, as shown in FIG. 5, the slide hammer 30 may be spring loaded so that the slide hammer 30 does not slide up and down the shaft 20 freely. As shown in FIG. 5, the second end 24 of the shaft 20 may include a plate or cap 25. The plate or cap 25 may be coupled or connected to the second end 24. Optionally, the plate or cap 25 may be coupled or connected to the second end 24 with a fastener 27, in this example, a screw. Optionally, the second end 24 may include a recess 29 configured to receiver the fastener 27. The spring 21 may act between the plate or cap 25 and a first end 31 of the slide hammer 30. The spring 21 may bias the first end 31 of the slide hammer 30 towards the first end 22 of the shaft 20. A force acting on the slide hammer 30, pulling it towards the second end 24 of the shaft 20, compresses the spring 21. When the slide hammer 30 reaches its maximum travel towards the second end 24 of the shaft 20, the force is transferred to the shaft 20, pulling the hook 26 engaged with a hubcap in a direction perpendicular or substantially perpendicular to the hubcap to detach the hubcap from a wheel.

Figure 6:
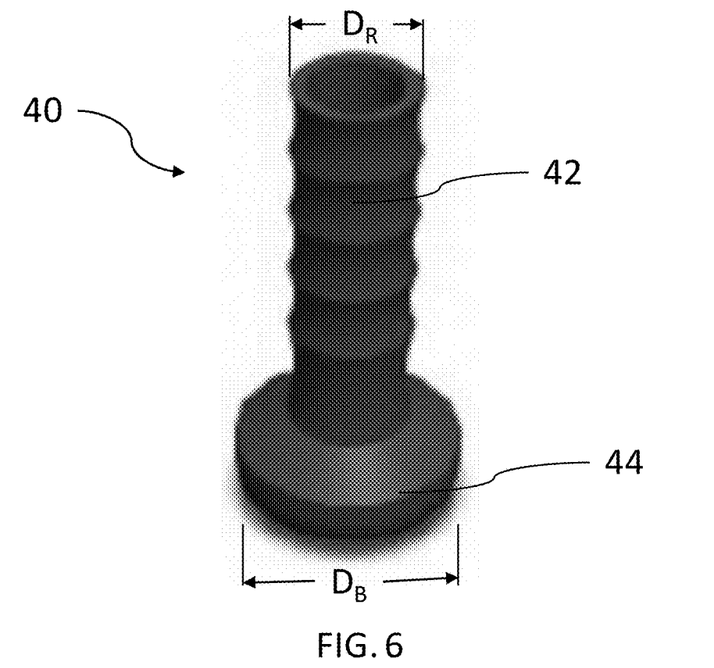
FIG. 6 is a perspective view of an example grip of the device of FIG. 1.
Figure 7:
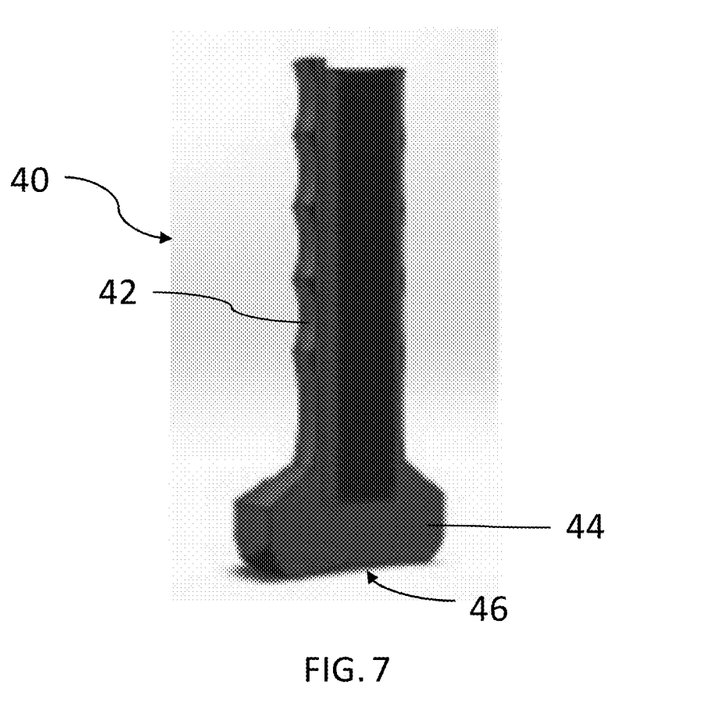
FIG. 7 is a section view of the example grip of FIG. 4.

As shown in FIG. 1, FIG. 2, and FIG. 5, the device 10 may also include a grip 40. The grip 40 may be coupled to the slide hammer 30. The grip 40 may be coupled to the second end 24 of the shaft 20. The grip 40 may be coupled to the second end 24 of the shaft 20 via the slide hammer 30. With reference to FIG. 6 and FIG. 7, the grip 40 may include a receiving portion 42 configured to receive the slide hammer 30 and/or the second end 24 of the shaft 20. The receiving portion 42 may be hollow to receive the slide hammer 30 and/or the second end 24 of the shaft 20. The receiving portion 42 may be coupled or connected to the slide hammer 30 and/or the second end 24 of the shaft 20. The receiving portion 42 may be coupled or connected to the slide hammer 30 and/or the second end 24 of the shaft 20 via fasteners, adhesive, or friction fit. The exterior surface of the receiving portion 42 may be configured to fit the base of a user's hand. The grip 40 may include a base 44. In one example, the base 44 is elastomeric. The base 44 may have a diameter $D_B$ greater than a diameter $D_R$ of the receiving portion. In one example, the base 44 may have a concave surface 46. The shape, diameter, and/or material of the grip 40 may be configured to allow a user to use the grip 40 to attach a hubcap to a wheel. For example, a user may use the grip 40 to apply force to the hubcap to attach the hubcap to the wheel. The generally large surface 46 of the grip 40 may distribute the force equally across the hubcap allowing attachment of the hubcap without damaging the hubcap and/or wheel. Optionally, the grip can comprise a rubber, polymer, and/or plastic material. However, it is contemplated that any suitable materials can be used.

Figure 8:
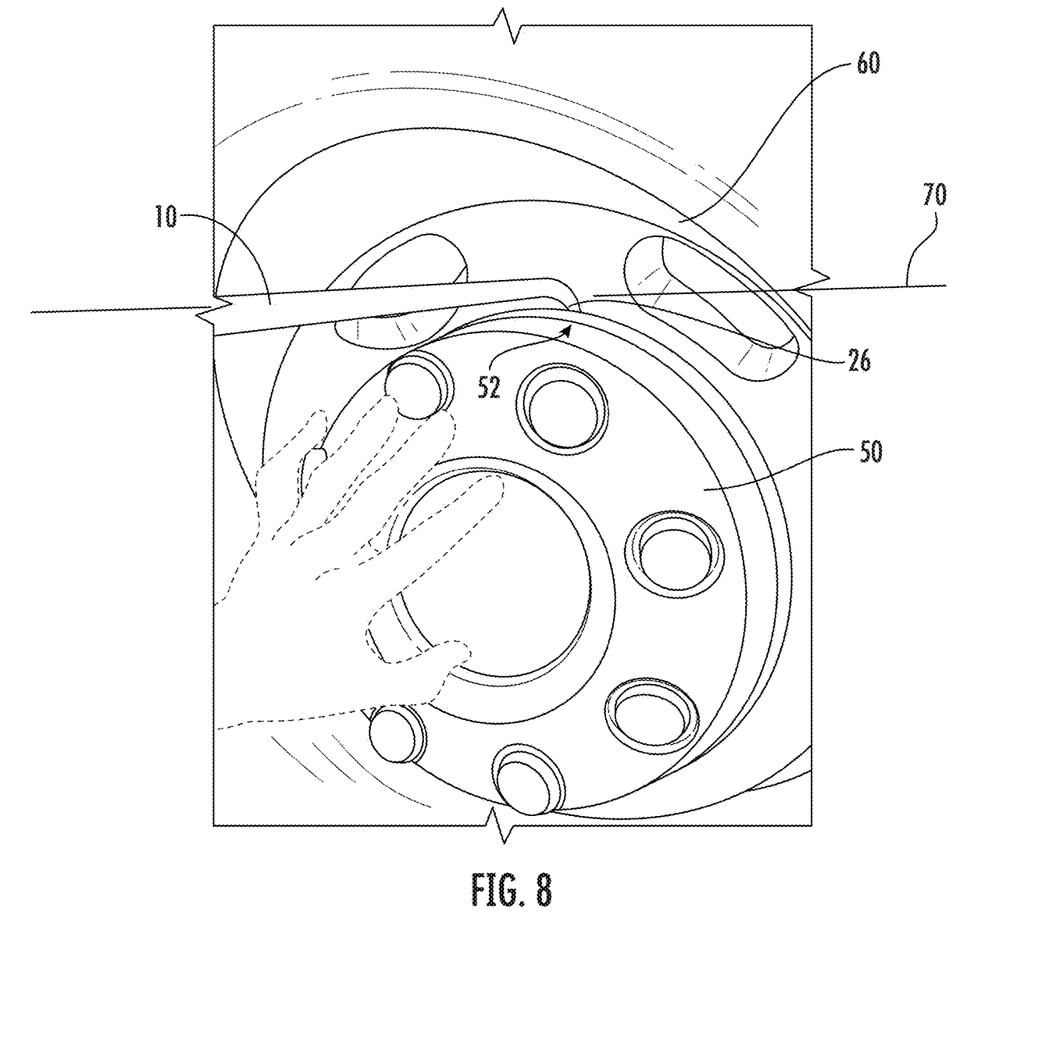
FIG. 8 shows a user inserting a hook of the device into a hubcap slot.
Figure 9:
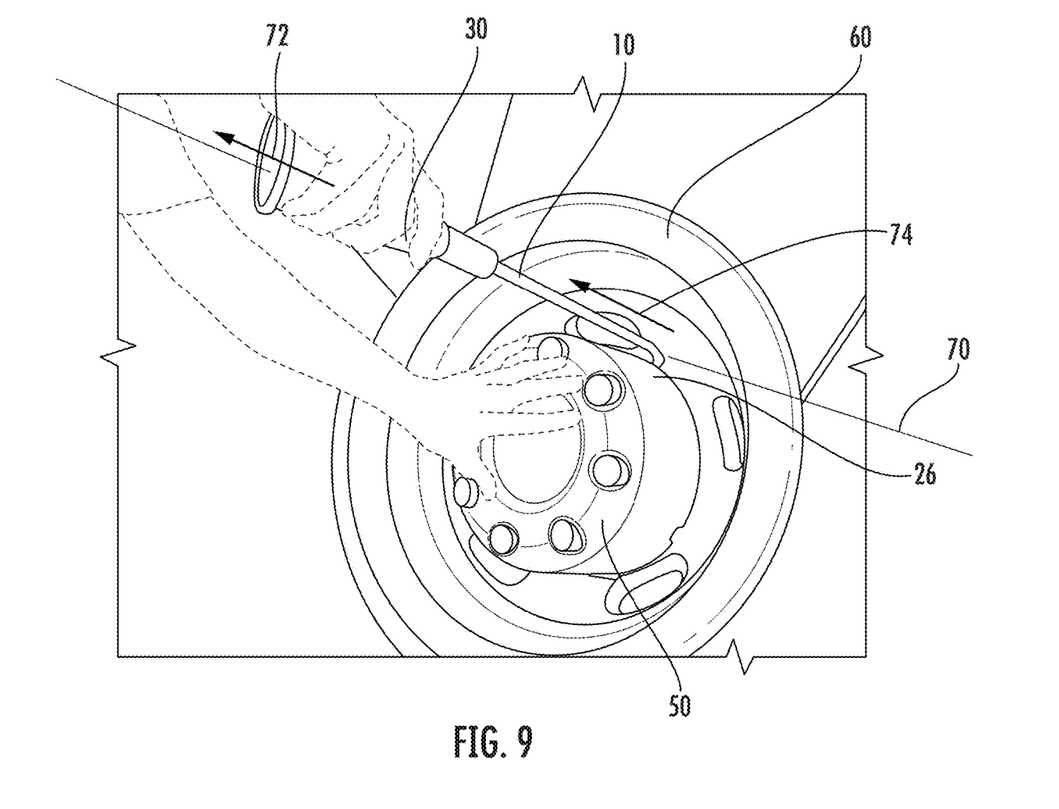
FIG. 9 shows the user pulling on a slide hammer of the device.
Figure 10:
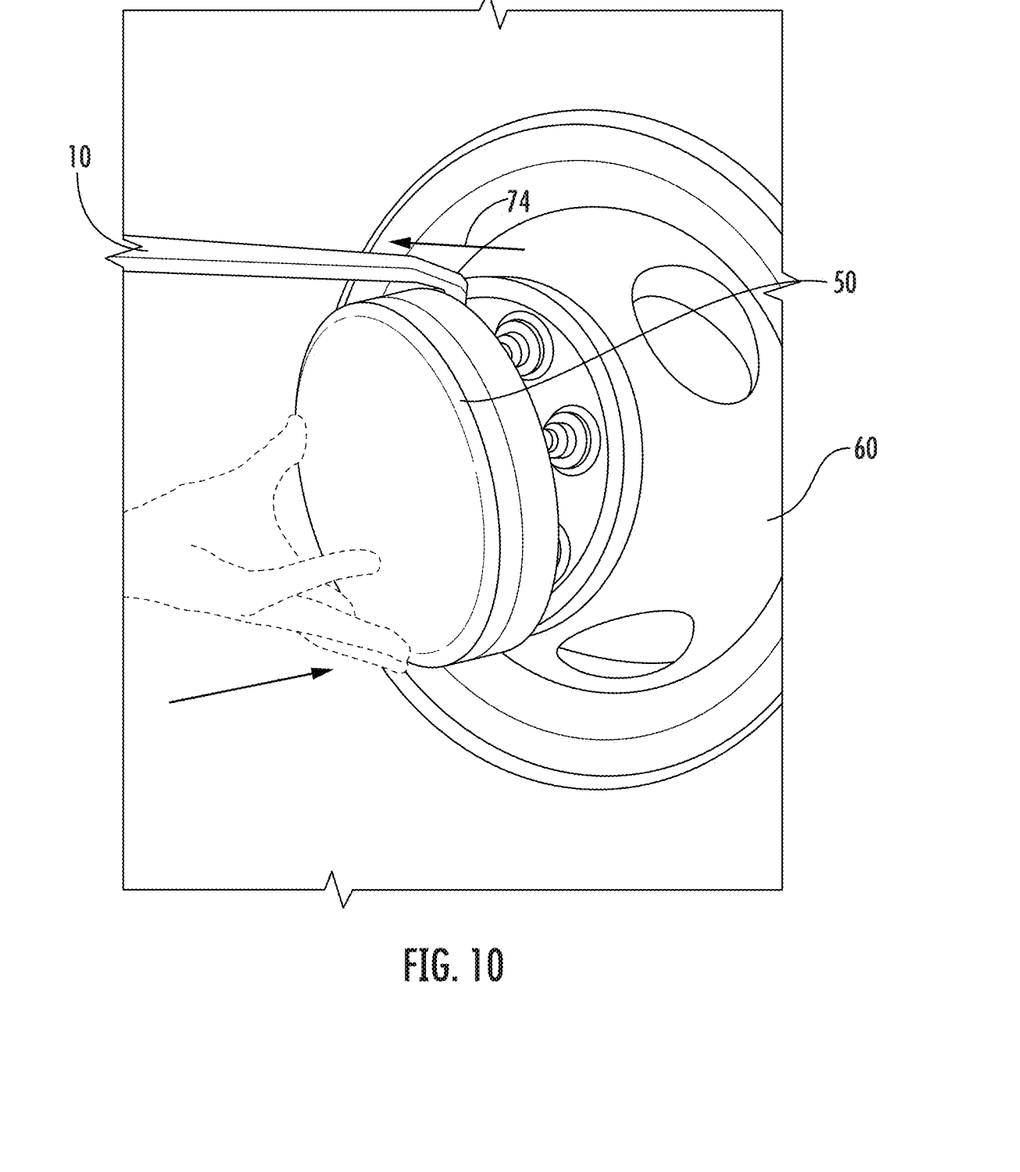
FIG. 10 shows the hubcap disengaging from the wheel.

FIGS. 8-10 show a method of removing a hubcap 50 from a wheel 60 with an example device 10. The device 10 may be used to remove the hubcap 50 by using the device 10 to apply a force to the hubcap 50 along a first axis 70. As shown in FIG. 8, the first axis 70 may be perpendicular or substantially perpendicular to the hubcap 50. The hook 26 of the device 10 may be inserted into a hubcap slot 52. With reference to FIG. 9, a first force 72 acting on the slide hammer 30, such as a user pulling on the slide hammer 30, along the first axis 70 in a first direction away from the wheel 60 may cause the hook 26 to apply a second force 74 to the hubcap 50 along the first axis 70 in the first direction. In one example, the user may provide pressure to the hubcap 50 with a first hand and pull the slide hammer 30 with a second hand. With reference to FIG. 10, the second force 74 acting on the hubcap 50 may disengage the hubcap 50 from the wheel 60. The user may apply pressure on the hubcap 50 with a hand to prevent the hubcap 50 from falling when disengaged from the wheel 60.

Figure 11:
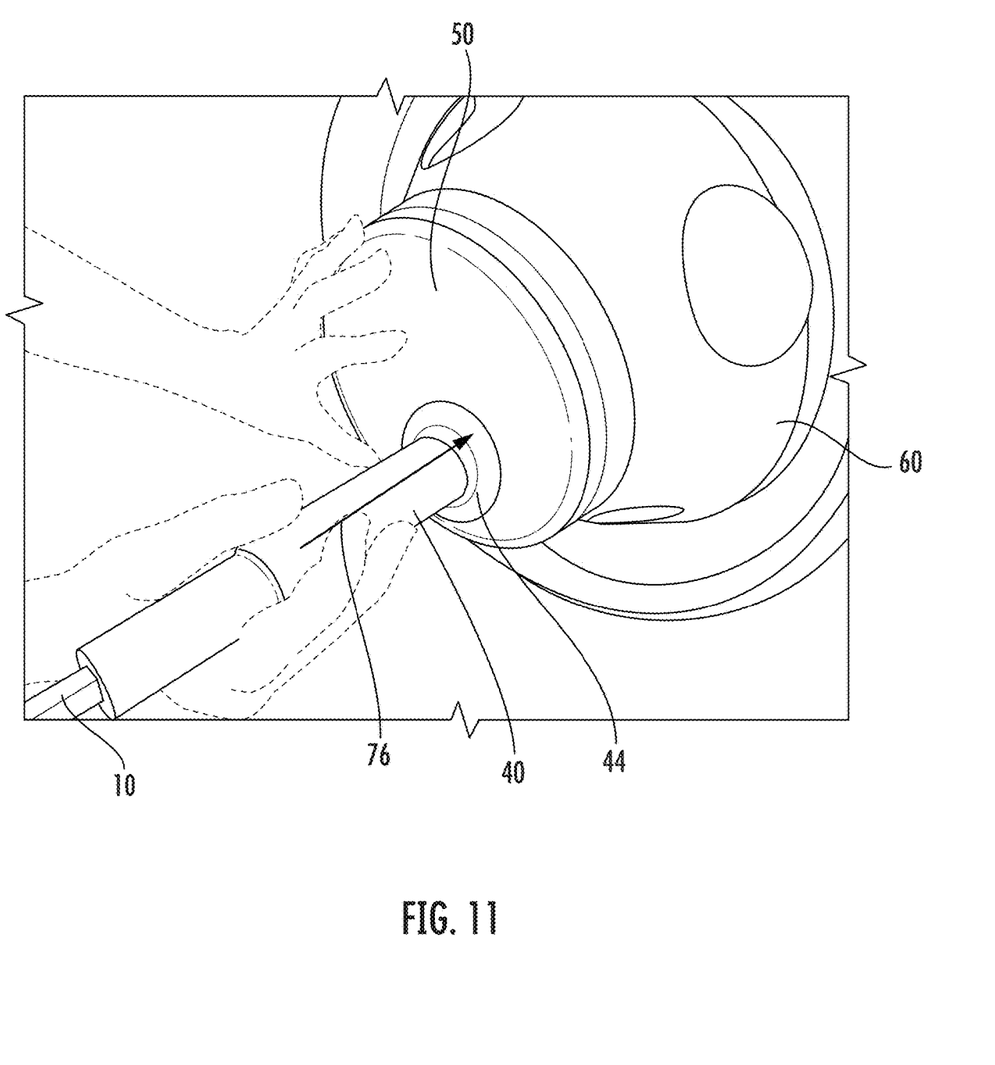
FIG. 11 shows a user attaching a hubcap to the wheel by applying force to the hubcap with a grip of the device.

With reference to FIG. 11, the device 10 may be used to attach a hubcap 50 to a wheel 60 of a vehicle. The base 44 of the grip 40 of the device 10 may be used to apply a force 76 to the hubcap 50 to attach the hubcap 50 to the wheel 60. In one example, a user may use a first hand to apply pressure to the hubcap and a second hand to apply the force 76 via the base 44 of the grip 40 to the hubcap 50.

Although the foregoing invention has been described in some detail by way of illustration and example for purposes of clarity of understanding, certain changes and modifications may be practiced within the scope of the appended claims.

What is claimed is:

1. A device configured to remove a hubcap from a wheel of a vehicle without using torque or leverage applied against a component that is not the hubcap, wherein the device comprises:
    a shaft including a first end and a second end, the first end including a hook having a degree of bend greater than 90 degrees; and
    a slide hammer coupled to the shaft between the first end and the second end, the slide hammer being spring-loaded, wherein a first force acting on the slide hammer along a first axis perpendicular to the hubcap in a first direction away from the wheel causes the hook to apply a second force to the hubcap along the first axis in the first direction.

2. The device according to claim 1, wherein the device is further configured to remove the hubcap by applying the second force to the hubcap along the first axis that is perpendicular to the hubcap.

3. The device according to claim 1, wherein the shaft has a length ranging from 11.5 to 13.5 inches.

4. The device according to claim 1, wherein the degree of bend of the hook ranges from 130 to 200 degrees.

5. The device according to claim 1, wherein the hook includes a rubber coating.

6. The device according to claim 1, wherein the hook has a width ranging from 0.4 to 0.6 inches.

7. The device according to claim 1, wherein the hook has an inner radius ranging from 0.1 to 0.3 inches.

8. The device according to claim 1 further comprising a grip coupled to the second end of the shaft.

9. The device according to claim 8, wherein the grip includes a receiving portion configured to receive the second end of the shaft and an elastomeric base having a diameter greater than a diameter of the receiving portion of the grip.

10. The device according to claim 1, wherein the second end of the shaft comprises a cap, and wherein the spring of the spring-loaded slide hammer acts between the cap and a first end of the slide hammer and biases the first end of the slide hammer towards the first end of the shaft.

11. The device according to claim 10, wherein the slide hammer is configured such that a force acting on the slide hammer pulls the slide hammer towards the second end of the shaft thereby compressing the spring.

12. The device according to claim 11, wherein the slide hammer is configured such that upon compressing the spring and the slide hammer reaching its maximum travel towards the second end of the shaft, the force transfers to the shaft to pull the hook to apply the second force to the hubcap.

\* \* \* \* \*